Figure 1:
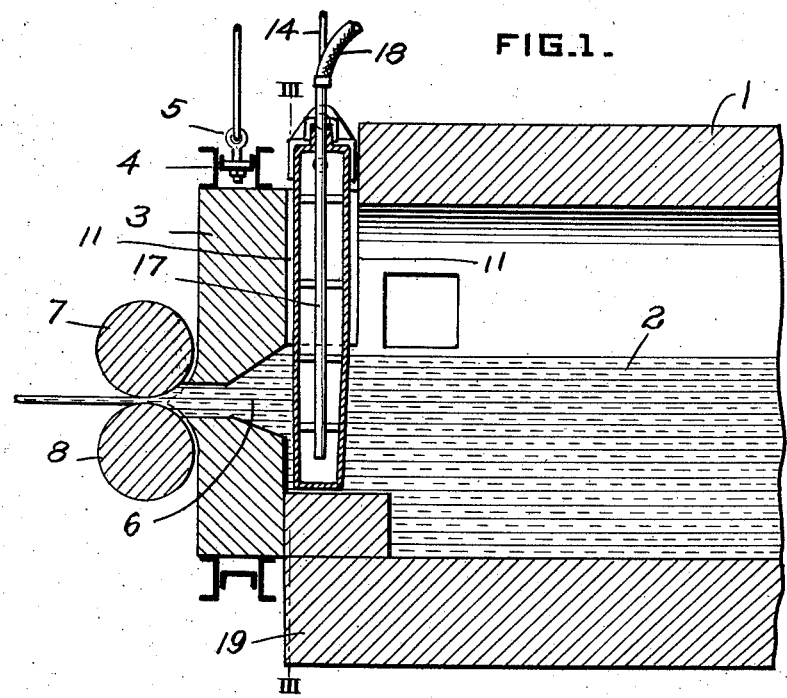

Jan. 12, 1926.

W. OWEN 1,569,134

GATE FOR GLASS TANKS

Filed Dec. 8, 1923 3 Sheets-Sheet 1

INVENTOR
William Owen
by
James C. Bradley
Atty.

Jan. 12, 1926.
W. OWEN
GATE FOR GLASS TANKS
Filed Dec. 8, 1923
1,569,134
3 Sheets-Sheet 2
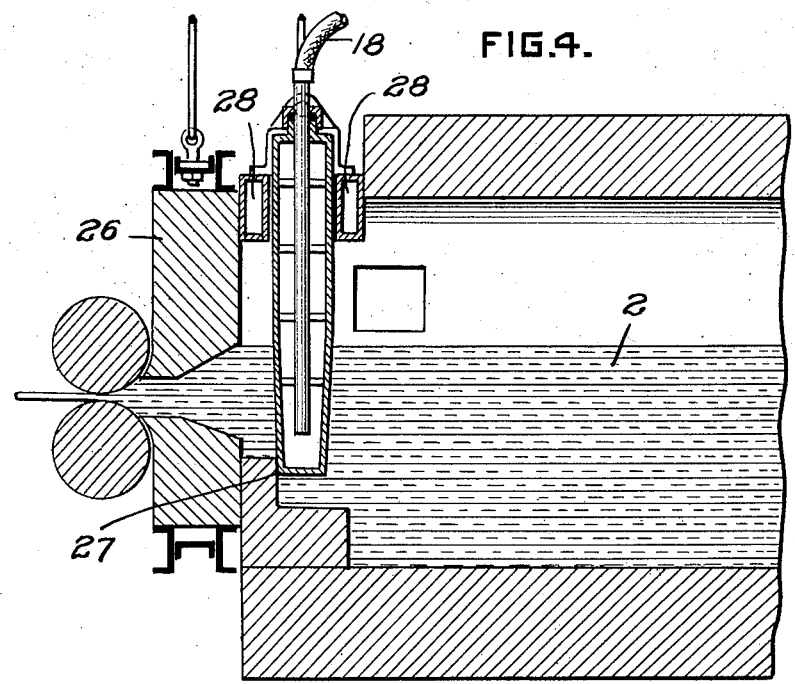
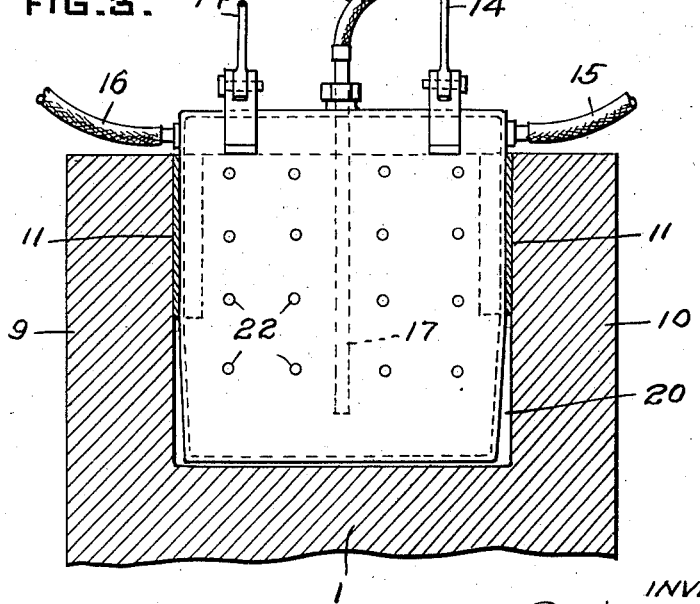
INVENTOR
William Owen
by
James C. Bradley
atty Patented Jan. 12, 1926.

1,569,134

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

GATE FOR GLASS TANKS.

Application filed December 8, 1923. Serial No. 679,343.

*To all whom it may concern:*

Be it known that I, WILLIAM OWEN, a citizen of the United States, and a resident of Pittsburgh, in the county of Allegheny and State of Pennsylvania, have made a new and useful invention in Improvements in Gates for Glass Tanks, of which the following is a specification.

The invention relates to a water cooled gate for shutting off the flow of glass from a glass tank, such as is used for the continuous formation of a ribbon of glass. Heretofore gates of refractory material, such as clay, have been used for this purpose. Such gates are open to a number of objections. A gate of this type must make close contact at its edges with the walls and bottom of the tank when in closed position, or the molten glass will leak past it, and it is a very difficult matter to secure and maintain this condition, as the clay warps and is eaten away by the action of the glass, so that a close uniform closure soon becomes impossible. Furthermore, when this close contact is secured, the gate becomes welded in place, making it difficult to open, and the force required to open it tends to break away some of the clay of the gate or of the contacting surface of the tank walls or bottom, thus contaminating the glass and preventing a proper seating when the gate is again closed. This condition calls for replacement of the gate at frequent intervals, greatly increasing the upkeep, and interfering with the quality of the product. In some cases, large pieces of the gate break away and must be removed from the glass bath, or the product will be seriously impaired, and such removal of broken away sections is often a very difficult operation.

Figure 2:
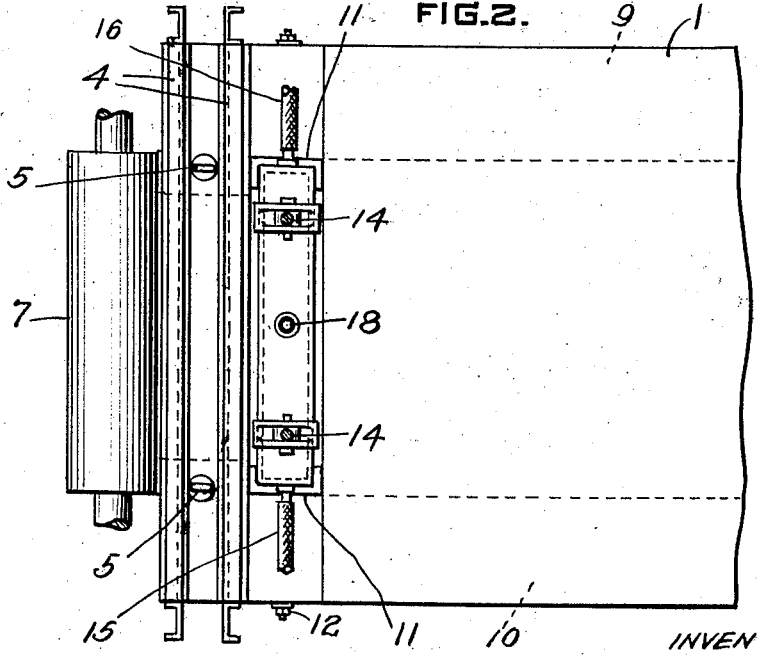
Figure 5:
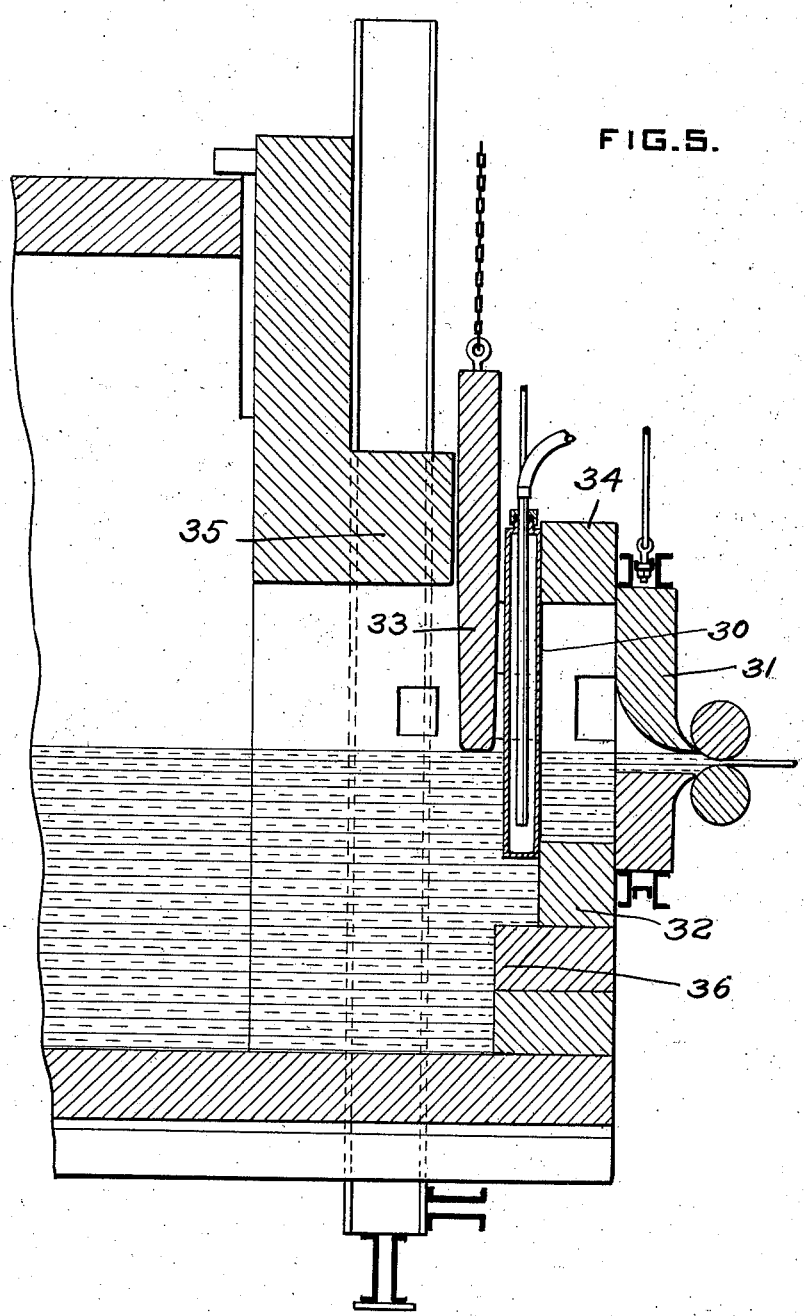

The object of the present invention is the provision of a gate which is free from the foregoing objections, and this is accomplished by the use of a water cooled metal gate which does not become warped and resists the corrosive action of the glass, so that it maintains a relatively close fit against the walls of the tank. Furthermore, any leakage past the gate is prevented, even though the contact between the gate and furnace is poor, since the glass lying between the metal of the gate and the walls of the furnace is solidified or frozen by reason of the low temperature of the gate thus providing a complete seal against leakage. There is also no difficulty in raising a gate of this kind as the gate does not become welded in position as is the case with a clay gate, so that the clay surrounding the gate is not loosened when it is raised and the labor of lifting the gate is relatively slight. A further advantage lies in the fact that a metal gate may be located closer to the front wall of the tank than is the case with a clay gate, and the length of the clay shelf over which the glass flows in passing to the outlet is reduced to a minimum, thus correspondingly reducing the contamination of the glass from the clay as it passes over such shelf. The tank employed is preferably one in which the outlet slot is in the front wall, but the gate is applicable to other types of tanks in which the outlet slot may be in one of the other side walls or the bottom wall. Certain embodiments of the invention are illustrated in the accompanying drawings wherein:

Figure 1 is a vertical section through the forward end of a melting tank equipped with the invention. Fig. 2 is a plan view. Fig. 3 is a vertical section on the line III—III of Fig. 1. And Figs. 4 and 5 are sections similar to that of Fig. 1, but showing modified arrangements.

Referring to the arrangement of Figs. 1, 2 and 3, 1 is the forward end of the melting tank which is preferably of the regenerator type and carries a bath of molten glass 2. The front wall 3 of the tank is of clay surrounded by a supporting framework 4 of channel irons. This framework carries an eye 5 by means of which the front wall is supported from above and by means of which it may be removed and replaced with an overhead crane. This front wall is clamped up tightly against the front of the tank by means of securing straps and bolts, not shown. The front wall is provided with an outlet slot 6, opposite which is a pair of water cooled driven rolls 7 and 8 for giving the continuous ribbon, which is produced, a uniform thickness. Mounted in the side walls 9 and 10 of the tank are a pair of guide channels 11 held in position by means of the bolts 12 and composed of heat resisting metal such as calite or nichrome.

The gate 13 is mounted in the channels and supported from above by means of the bars 14 which are connected to a crane whereby the gate may be raised and lowered through the opening provided in the top of the tank. The gate is made of heat resisting metal and is water cooled by a circulation of water. The water is preferably supplied through the flexible pipes 15 and 16, leading into the sides of the gate at is upper end as indicated in Fig. 3, and an outlet is provided through the pipe 17 leading to the lower end of the gate and connected at its upper end to the flexible pipe 18. The gate is preferably tapered in both directions as indicated in Figs. 1 and 3, so that its withdrawal may be more readily accomplished after the glass has set or hardened around the gate. When in its lowered position the lower end of the gate comes closely adjacent to the block 19 and a tight seal is secured at this point and in the spaces 20 and 21 at the sides of the gate (Fig. 3) by reason of the fact that the relatively cold gate causes the glass at these points to freeze so that no leakage of glass past the gate is possible after it is once seated. The gate is preferably made of sheet metal provided with stay bolts 22 extending from one side wall to the other in order to stiffen the structure and to reduce the tendency to warp.

When the gate is once seated, it is securely held in position by means of the guide channels 11 and is sufficiently supported so that the entire front wall 3 may be taken away for replacement or renewal, this renewal being required at intervals because of the eating or wearing away of the clay surface forming the walls of the slot 6. When it is desired to raise the gate, this is readily accomplished since the temperature of the metal forming the gate is such that the glass does not adhere thereto and the removal of the gate from the chilled socket of the glass is also facilitated by reason of the fact that the gate is tapered as heretofore referred to.

Fig. 4 illustrates a modification in which the gate 25, which is hollow and water cooled as in the other type of construction is placed somewhat farther to the rear of the front wall 26 of the tank than in the other construction and makes its seal against the rear face of the block 27. In this form of construction, the gate is guided by the two hollow members 28 and 29 set into the top wall of the tank and cooled by a circulation of water therethrough.

Fig. 5 illustrates a slightly different arrangement in which the gate 30 is set back still farther from the front wall 31 and seats against the rear face of the block 32. To shield the portion of the gate above the surface of the glass and additional member 33 of refractory material, such as clay, may be employed. Such member is preferably supported from above for vertical movement, and when the gate 30 and member are in raised or inoperative position, their lower ends close the space between the arch member 34 and 35, or they may be removed entirely and the space closed by a clay slab. The member 33 not only shields and protects the gate 30 from the heat from the furnace tending to strain and crack it, but also prevents the bath of glass back of the gate from being unduly chilled while the gate is in lowered position. In case of any accident to the gate, the member 33 may be used as a gate or cut off by lowering it so that its lower end lies behind the portion 36 of the front wall of the furnace. The portion of the gate above the surface of the glass may also be protected on its rear by insulation carried by the gate, if desired.

What I claim is:

1. The combination with a melting tank having an outlet opening at its forward end, of a water cooled metal gate to the rear of such outlet opening mounted for vertical movement through the top of the tank, and adapted when lowered to cut off the flow of glass to said outlet, the walls of the gate being tapered to permit of its ready withdrawal from the glass.

2. The combination with a melting tank having an outlet opening at its forward end, of a water cooled metal gate to the rear of such outlet opening mounted for vertical movement through the top of the tank, and adapted when lowered to cut off the flow of glass to said outlet, and a vertically movable shield of refractory material to the rear of the gate.

3. The combination with a melting tank having an outlet opening at its forward end, of a water cooled metal gate to the rear of such outlet opening mounted for vertical movement through the top of the tank, and adapted when lowered to cut off the flow of glass to said outlet, and a vertically movable shield of refractory material to the rear of the gate adapted to be lowered to a position with its lower edge adjacent the surface of the glass bath or to be lowered into the glass and form an emergency cut off or gate.

4. The combination with a melting tank having an outlet opening at its forward end, of a water cooled metal gate to the rear of such outlet opening mounted for vertical movement through the top of the tank, and adapted when lowered to cut off the flow of glass to said outlet, and removable shielding means of refractory material at the rear of the gate extending to a point adjacent the surface of the glass bath when the gate is in lowered position.

In testimony whereof, I have hereunto subscribed my name this 16th day of Nov., 1923.

WILLIAM OWEN.